United States Patent [19]
Boyce et al.

[11] Patent Number: 5,785,086
[45] Date of Patent: Jul. 28, 1998

[54] VALVE ASSEMBLY FOR METERED FLUID FLOW

[76] Inventors: J. Stephen Boyce, P.O. Box 1467, Dudley, Mass. 01571; William T. Mueller, P.O. Box 988, East Longmeadow, Mass. 01028

[21] Appl. No.: 889,515

[22] Filed: Jul. 8, 1997

[51] Int. Cl.$^6$ .................................................. F16K 11/07
[52] U.S. Cl. ...................................... 137/625.38; 73/201
[58] Field of Search .......................... 137/625.38, 599.1; 79/201

[56] References Cited

U.S. PATENT DOCUMENTS

| | | |
|---|---|---|
| 1,006,566 | 10/1911 | Koechlin . |
| 1,458,718 | 6/1923 | Lord . |
| 1,659,126 | 2/1928 | Van Atta ............... 137/625.38 |
| 2,579,656 | 12/1951 | Douglas et al. . |
| 3,238,969 | 3/1966 | Champion . |
| 3,289,696 | 12/1966 | Champion . |
| 3,296,859 | 1/1967 | Stewart . |
| 3,386,473 | 6/1968 | Driscoll . |

*Primary Examiner*—John Fox
*Attorney, Agent, or Firm*—Blodgett & Blodgett, P.C.

[57] ABSTRACT

A valve assembly for a metered fluid flow such as gas to a facility for utilizing the fluid. The valve assembly includes a housing having a bore. The bore has a first inlet opening connected to a source of fluid and a first outlet opening connected to a meter. the bore has a second inlet opening connected to the meter and a second outlet opening connected to the facility. A piston which contains a fluid passageway is slidably mounted within the bore for selective movement to at least two operating pistons, including a metered fluid flow position and a fluid flow meter bypass position. The fluid passageway within the piston has an inlet port and an outlet port. When the piston is in the metered fluid flow position, the first inlet opening is in fluid communication with the first outlet opening and the second inlet opening is in fluid communication with the second outlet opening to enable fluid from the source to flow through the meter to the facility. When the piston is in the fluid flow meter bypass position, the inlet opening is in fluid communication with the inlet port and blocked from fluid communication from the first outlet opening and the outlet port is in fluid communication with the second outlet opening and blocked from fluid communication with the second inlet opening so that fluid from the source is diverted through the fluid passageway to the facility. The valve assembly can be selectively moved to any one of its operating positions within the housing.

11 Claims, 5 Drawing Sheets

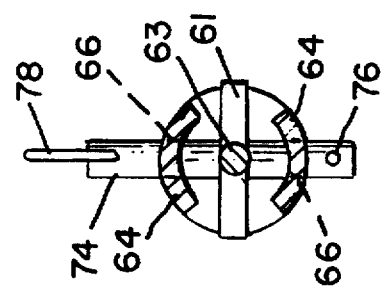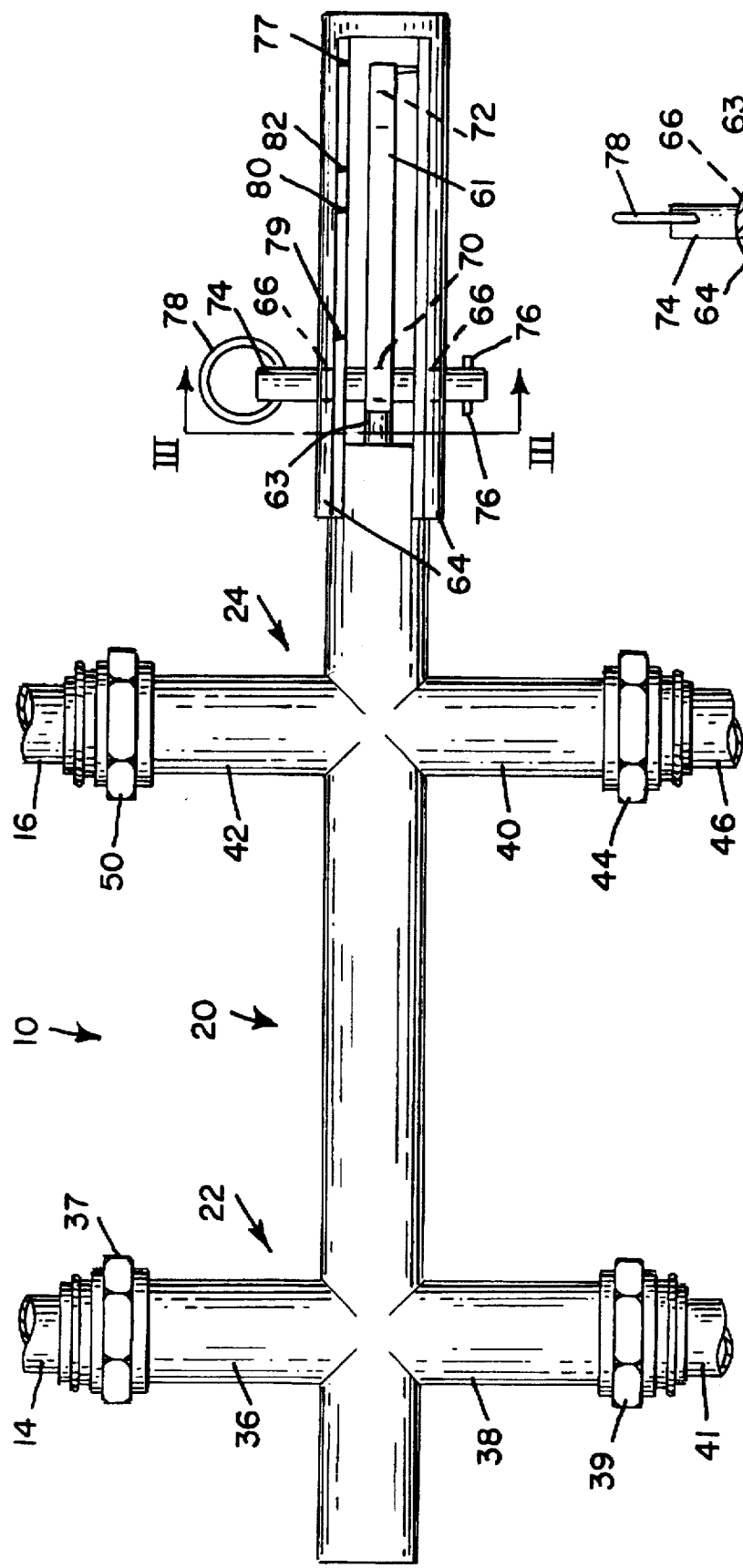
FIG. 2
FIG. 3

VALVE ASSEMBLY FOR METERED FLUID FLOW

CROSS-REFERENCE TO RELATED APPLICATIONS

Not Applicable

STATEMENT REGARDING FEDERALLY SPONSORED RESEARCH OR DEVELOPMENT

This invention has been created without the sponsorship or funding of any federally sponsored research or development program.

BACKGROUND OF THE INVENTION

The present invention is generally directed to a valve assembly for controlling metered fluid flow. The invention is more specifically directed to a bypass valve assembly for the meter bar of a gas meter. A gas meter bypass allows the pressure flow of gas to remain "on" and undisturbed, while bypassing the meter. This enables the meter to be changed for inspection or replacement, without the need to shut off or re-light any natural gas equipment or appliances within the building. There are as many as 80 million such gas meters in service in the United States and 100+ million world wide. Most states and jurisdictions require periodic inspections and tests of the meter, typically every 7 to 10 years which necessitates the servicing of millions of meters per year.

The difficulty in changing meters without a gas meter bypass, is that such meter servicing requires the operator to:

(1) Ask permission to enter the house and shut off each individual appliance and/or safety pilot light.
(2) Return to "set the meter".
(3) Shut off the main gas service valve, this can create a leak if this valve has not been turned for many years.
(4) Remove the old gas meter.
(5) Install a new gas meter, turn on service valve and purge air from the meter.
(6) Reenter the house, purge air from the meter and appliance house lines and light pilots, etc. This can take as much as an hour of the operator's time.
(7) Check operation of all burners and safety controls. At times, this stopping and restarting of equipment and appliances may cause equipment failures and necessitate equipment repairs. This is time consuming, expensive, burdensome to the customer, burdensome for scheduling, often causes poor customer relations, creates hazards for the operator in moving inside the building and basements, and sometimes creates legal involvement for access or damage.

Conventional gas meter connection bars were developed years ago to insure a rigid connection between the gas meter service pipe and the customer's house pipe, upon which the meter is hung. Meter bypass systems have been developed and used by the gas industry. These bypass systems employ traditional ball valves, turn valves or screw valves to enable gas to bypass the meter. The meter bypass systems which have been developed are complex, expensive, and time consuming when used by the gas service person in changing or repairing the gas meter.

A principal object of the present invention is the provision of a valve assembly for a gas meter which requires substantially less time for changing gas meters. This invention can be incorporated into the meter bar for new gas piping installations and can also be made as a retrofit unit which can be placed between a conventional meter bar and the gas meter to provide a gas bypass capability on existing meter installations which have a conventional meter bar. It has been estimated that a one-person meter truck can change about ten meters per day at a cost of approximately $40.00 per meter when labor, benefits and overheads are considered. This invention will reduce the average job time for changing out the meter by approximately one half the time. This could almost double the number of meter change outs which can be performed in an eight hour shift creating a significant gain in productivity and substantial lowering of operational costs.

A further object of this invention is the provision of a valve assembly for a gas meter bar with a built in bypass or retrofit which provides for the prevention of leakage of gas, for the prevention of the pilfering of gas, and for the prevention of other undesirable consequences.

Another object of this invention is the provision of a valve assembly for gas which it allows for the complete shut off of gas to a building when moved to the closed position. This creates a positive lock out or "lock off" of gas to the building without having to remove the meter from the meter bar to place a "lock off" seal or plug between the meter and the meter bar. This feature provides significant operational savings and is an added safety feature. The valve mechanism of the present invention provides an additional mechanism for shutting off gas from the building under normal or emergency conditions, without the need for special tooling or the need to close the main service gas valve before the meter.

A further object of this invention is the provision of a valve assembly which enables a gas meter to be changed without interrupting service, without requiring special handling or cumbersome equipment, and without requiring special fittings to be installed at the time the meter is installed for a new customer or at the time a change of location of the meter is set is requested.

A further object is the provision of a valve assembly which is simple and inexpensive and enables the use of standard fittings which are currently in use in the gas industry and enables standard tools to be used such as a basic pipe wrench to turn the fittings.

Further objects and features of the invention will be apparent from the following claims and the accompanying drawings.

With these and other object in view, as will be apparent to those skilled in the art, the invention resides in the combination of parts set forth in the specification and covered by the claims appended hereto.

BRIEF SUMMARY OF THE INVENTION

The valve assembly of the present invention makes use of a slide action bypass which is essentially one pipe sliding inside another pipe with ports or outlets provided at appropriate points along the walls of the interior pipe to selectively enable fluid such as gas to flow from a supply source of fluid through a meter to a facility and to prevent the fluid from flowing through the meter and to divert the fluid through the interior pipe to the facility. The valve assembly includes a housing having a bore. The bore has a first inlet opening connected to a source of fluid and a first outlet opening connected to the meter. The assembly has a first fixture for connecting the first inlet opening to the source of fluid, a second fixture for connecting the first outlet opening to the fluid inlet of a meter, a third fixture for connecting a second inlet opening to the outlet of the meter and a fourth fixture for connecting a second outlet opening to the facility. A pipe or piston which contains a fluid passageway is slidably mounted within the bore for selective movement to at least two operating positions, including a metered fluid flow position and a fluid flow meter bypass position. The fluid passageway within the piston has an inlet port and an outlet port. When the piston is in the metered fluid flow position, the first inlet opening is in fluid communication with the first outlet opening and the second inlet opening is in fluid communication with the second outlet opening to enable fluid from the source of fluid to flow through the meter to the facility. When the piston is in the fluid flow meter bypass position, the inlet opening is in fluid communication with the inlet port and is blocked from fluid communication from the first outlet opening. At the same time, the outlet port is in fluid communication with the second outlet opening and blocked from fluid communication with the second inlet opening so that fluid from the source is diverted away from the meter through the fluid passageway to the facility. The valve assembly includes means for enabling the piston to be selectively moved to any one of its operating positions relative to the housing.

BRIEF DESCRIPTION OF THE DRAWINGS

The character of the invention, however, may be best understood by reference to one of its structural forms, as illustrated by the accompanying drawings, in which:

FIG. 2 is a fragmentary side elevational view of the valve assembly;

FIG. 3 is a vertical cross-sectional view taken along the line III—III of FIG. 2 and looking in the direction of the arrows;

DETAILED DESCRIPTION OF THE INVENTION

Figure 1:
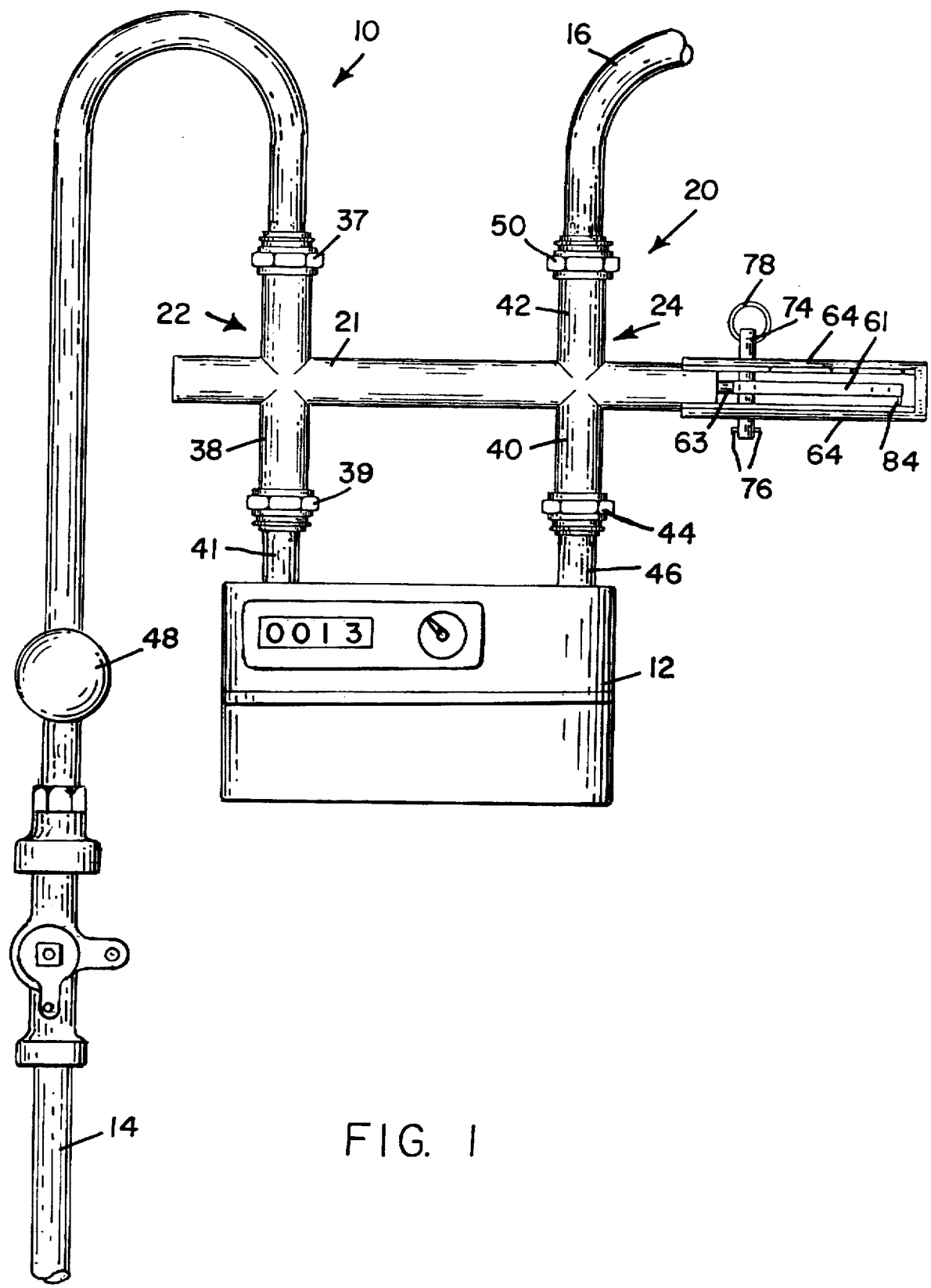
FIG. 1 is a side elevational view of the valve assembly of the present invention shown applied to a gas meter, and a gas supply.

Referring particularly to FIGS. 1 and 2, the valve assembly of the present invention is generally indicated by the reference numeral 10 and is shown in FIG. 1 operatively connected to a gas meter 12, a gas supply or inlet pipe 14, and a gas outlet pipe 16 which delivers gas to a facility for using the gas such as a dwelling, not shown. The valve assembly 10 comprises a housing, generally indicated by the reference numeral 20. The housing 20 includes a bypass conduit 21, an inflow conduit, generally indicated by the reference numeral 22, and an outflow conduit, generally indicated by the reference numeral 24. The conduits 22 and 24 extend transversely of the bypass conduit 21.

Figure 4:
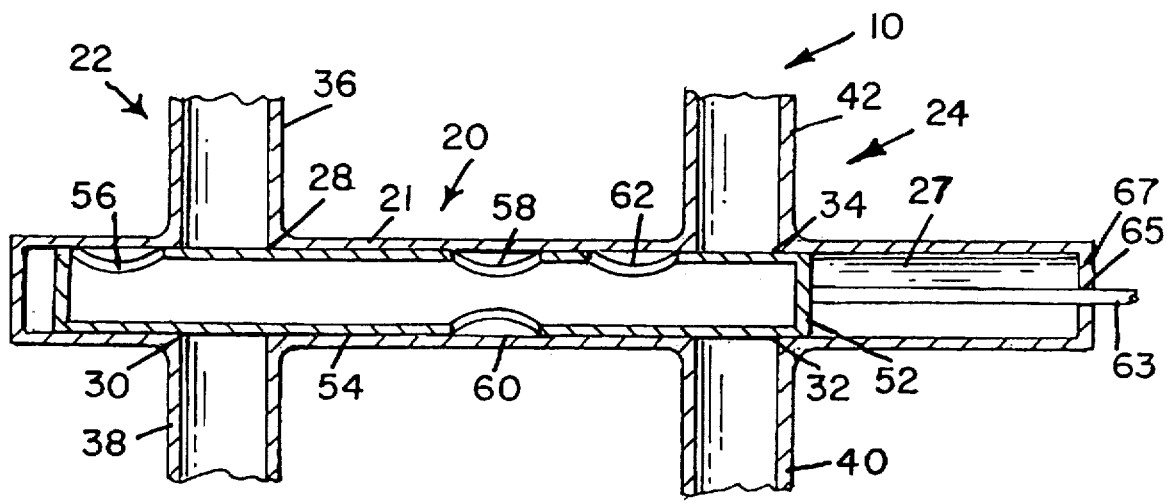
FIG. 4 is a fragmentary vertical cross-section view of the valve assembly, showing the valve assembly in the closed position.

Referring particularly to FIGS. 1, 2, and 4, the bypass conduit 21 has a cylindrical bore 27. The bore 27 has a first inlet opening 28, a first outlet opening 30, a second inlet opening 32, and a second outlet opening 34. The conduit 22 has an inlet portion 36 which is connected to the first inlet opening 28 and to the gas supply or inlet pipe 14 by a first coupling fixture 37. The inflow conduit 22 has a second portion 38 which is connected to the first outlet opening 30 and to the meter 12 by a second coupling fixture 39 and a pipe 41. The outflow conduit 24 has an inlet portion 40 connected to the gas meter 12 by a third coupling fixture 44 and pipe 46 and to the second inlet opening 32. The outflow conduit 24 is connected to the second outlet opening 34 and to the outlet pipe 16 by a coupling fixture 50. A conventional pressure regulator 48 is located in the gas supply line 14.

Referring to FIGS. 4–9, the valve assembly 10 includes an elongated cylindrical piston 52 is positioned within the bore 27 for axial sliding movement relative to the bypass conduit 21. The piston 52 has a fluid passageway 54 which has a first inlet port 56, a first outlet port 58, a second inlet port 60 and a second outlet port 62. The ports 58 and 60 are opposite one another, transversely of the longitudinal axis of the piston 52 and located between the ports 56 and 62. A connecting rod 63 is fixed to one end of the piston 52 and extends through an aperture 65 in an end wall 67 of the housing 20. The outer end of the rod 63 is fixed to a flat handle 61. The handle 61 enables the piston 52 to be moved axially and selectively to any one of its several operating positions.

Figure 6:
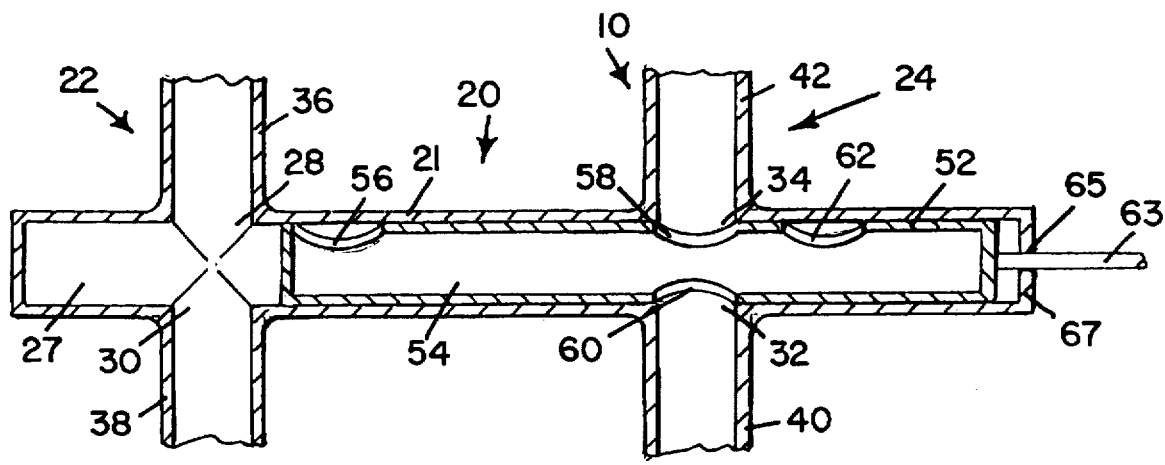
FIG. 6 is a view similar to FIG. 4, showing the valve assembly in the metering position, wherein gas flows to the facility through the meter.

Referring specifically to FIG. 6, the valve assembly 10 is shown in the metered gas flow position, wherein the first inlet opening 28 and the first outlet opening 30 are unobstructed by the piston 52. This allows the gas to flow from the gas supply pipe 14 to the gas meter 12. The first outlet port 58 of the piston 52 is aligned with the second opening 34. The second inlet port 60 of the piston 52 is aligned with the second inlet opening 32. This enables gas to flow from the meter 12 to the gas outlet pipe 16 via the outflow conduit 24. This is the normal operating condition for the valve assembly 10 of the present invention.

Figure 7:
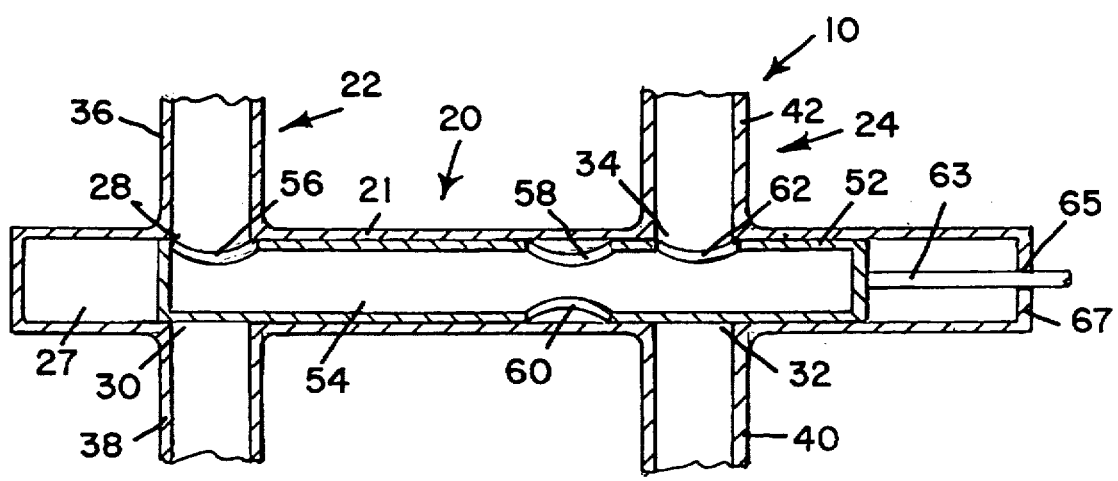
FIG. 7 is a view similar to FIG. 4, showing the valve assembly in the bypass position, wherein the meter is bypassed and gas is diverted directly to the facility.
Figure 8:
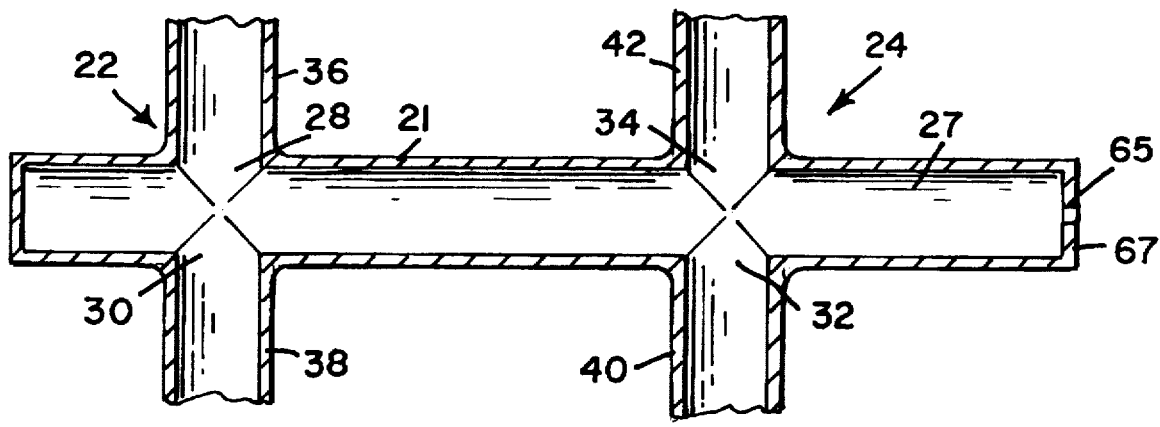
FIG. 8 is a vertical cross-sectional view of the housing portion of the valve assembly.
Figure 9:
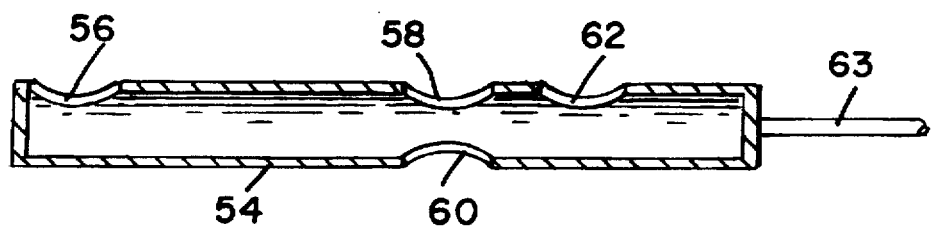
FIG. 9 is a vertical cross-sectional view of the piston portion of the valve assembly.

Referring specifically to FIG. 7, the piston 52 is shown in the meter bypass position, wherein the first inlet port 56 is aligned with the first inlet opening 28 and the first outlet opening 30 is closed by the piston 52. When the piston 52 is in the meter bypass position, the second inlet opening 32 is closed by the piston 52 and the second outlet port 62 is aligned with the second outlet opening 34. This enables gas from the gas supply pipe 14 to enter the fluid passageway 54 of the piston 52 through the first inlet opening 28 and the first inlet port 56. Gas flows through the fluid passageway 54 and enters the outlet portion 42 of the outflow conduit 24 via the second outlet port 62 and the second outlet opening 34. Therefore, the gas meter 12 is bypassed completely. This enables the meter 12 to be disconnected for repair or to be changed, without interrupting gas service to the dwelling 18.

Referring to FIG. 4, the piston 52 is shown in the gas shut off position, wherein the piston blocks the first inlet opening 28 and the first outlet opening 30 so that gas cannot enter the meter 12 or the piston 52. Also, the second outlet opening 34 and the second inlet opening 32 are closed so that gas flow between the meter 12 and the outlet pipe 16 is not possible.

Figure 5:
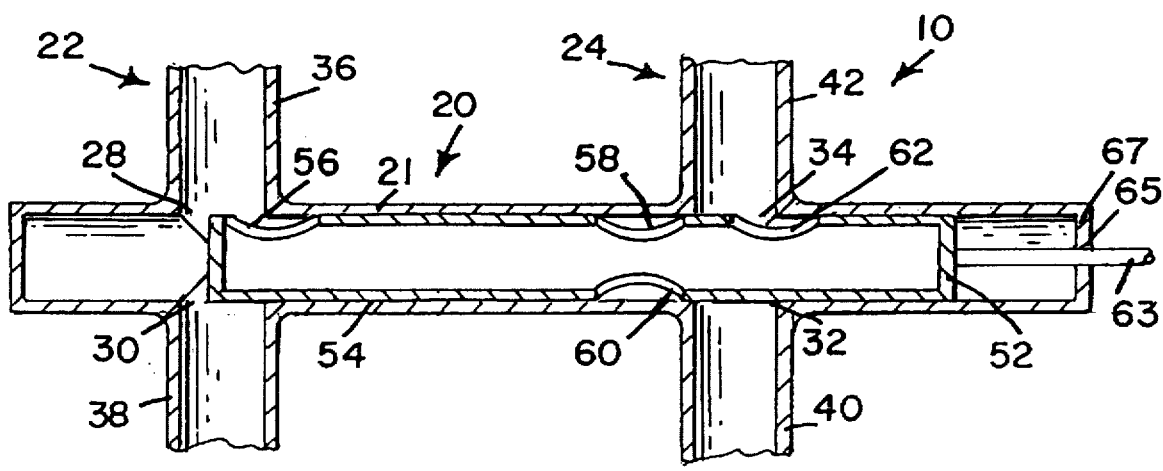
FIG. 5 is a view similar to FIG. 4, showing the valve assembly in an intermediate position which enables gas to flow simultaneously to the meter and to the facility.

Referring to FIG. 5, the valve assembly 10 is shown in an intermediate position, wherein the piston 52 does not block the first outlet opening 30 and the first inlet opening 28, thereby enabling gas to flow to the meter 12 from the gas supply inlet pipe 14. The first inlet port 56 is in partial register with the first inlet port 28 to enable gas to flow into the fluid passageway 54 from the pipe 14. The second outlet port 62 is in partial register with the second outlet opening 34 which allows gas to pass from the passageway 54 to the gas outlet pipe 16.

When installing a new or repaired meter, the meter is connected to the outlet portion 38 while the piston 52 is in the meter bypass position shown in FIG. 7. Prior to connecting the meter 12 to the inlet portion 12, the piston 52 is shifted to the intermediate position shown in FIG. 5. This enables gas to flow to the meter for purging the meter of air while maintaining uninterrupted gas service to the dwelling. Thereafter, the meter 12 is connected to the inlet portion 40 and the piston 52 is moved to the metered gas flow position shown in FIG. 6.

Referring to FIGS. 2 and 3, there is illustrated a locking mechanism for locking the piston 52 in either the full gas flow position, shown in FIG. 6, or the full gas shut off position, shown in FIG. 4. The handle 61 is located between a pair of spaced parallel brackets 64 which are fixed to one end of the housing 20 and which extend axially from the end of the housing. Each bracket 64 has an aperture 66. The apertures 66 of both brackets 64 are aligned transversely of the central longitudinal axis of the piston 52. The handle 61 has a pair of spaced apertures 70 and 72. When the piston 52 is in the metered gas flow position shown in FIGS. 2 and 6, the aperture 70 is aligned with the apertures 66. A locking pin 74 is extended through the apertures 66 and 70 for maintaining the piston 52 in the full gas flow position. The locking pin 74 is a standard device which is commonly used in the gas industry. The locking pin 74 has a pair of retaining pins 76 which are normally located in a withdrawn position within the locking pin. This enables the locking pin 74 to be inserted into the apertures 66 and 70. After the locking pin 74 is inserted through the apertures 66 and 70, as shown in FIG. 2, a special tool is applied to the pin 74 to cause the retaining pins 76 to protrude from the locking pin 74. This prevents the pin from being removed from the brackets 64. The opposite end of the locking pin 74 has a ring 78 to facilitate handling of the locking pin and which also prevents the locking pin 74 from being withdrawn from the apertures 66 and 70. The apertures 70 and 72 also function as locators for enabling a serviceperson to determine the metered gas flow and gas shut off positions of the pistons 52. One of the brackets 64 has a visual indicator marks 77, 79, 80, and 82. When the end of the handle 61 is aligned with the indicator mark 77, the piston 52 will be in the metered gas flow position and the aperture 70 will be aligned with the apertures 66. When the end of the handle is aligned with the mark 79, the piston 52 will be in the gas shut off position and the aperture 72 will be aligned with the apertures 66. When the piston 52 is in the gas bypass position, as shown in FIG. 7, the end of the handle 61 is vertically aligned with the indicated mark 80. When the piston 52 is in the intermediate position, as shown in FIG. 5, the end of the handle 61 is vertically aligned with the indicator mark 82. The handle 61 is manually actuated by the service person. However, in a fully automated system the handle 61 is connected to a solenoid valve which is actuated from a remote location by the gas company. The handle 61 is moved to either the metered position or to the gas shut-off position.

The end of the handle 61 has a downwardly extending resiliently flexible finger 84 which rides along the upper surface of the lower bracket 64. The upper surface of the lower bracket 64 has a plurality of notches which are vertically aligned with the visual indicator marks 77, 79, 80, and 82. The notches provide physical stopping points for the handle 61 for each of the operating positions of the piston 52. Preferably, the upper bracket 64 has words or lettering adjacent the indicator marks which assist the service personnel in positioning the handle 61 to achieve a desired operating position of the piston 52. The finger and associated notches will enable the service person to locate the piston 52 precisely at any operating position of the piston 52 and to maintain the piston 52 at that position. The handle 61 can be physically moved from any stopping position upon application of a predetermined force along the central longitudinal axis of the handle 61.

In some circumstances or applications of the metered gas service, there may be a requirement that the valve assembly can be either in a metered position or a meter bypass position and never in a gas shut off position. In such circumstances, the valve assembly 10 of the present invention is modified so that the housing 20 and piston 52 are shortened lengthwise to the extent that the piston 52 can never be in a blocking position with respect to the first inlet opening 28 and the second outlet opening 34, regardless of how much the piston 52 is moved in any axial direction.

What is claimed is:

1. A valve assembly for connection to a source of fluid to be metered, a facility for utilizing the fluid, and a fluid meter having a fluid inlet and a fluid outlet, said valve assembly comprising:

(a) a housing having an elongated bore, a first inlet opening to the bore, a first outlet opening to the bore, a second inlet opening to the bore, and a second outlet opening to the bore;

(b) a first fixture for connecting said first inlet opening to said source of fluid;

(c) a second fixture for connecting said first outlet opening to the fluid inlet of said meter;

(d) a third fixture for connecting said second inlet opening to the outlet of said meter;

(e) a fourth fixture for connecting said second outlet opening to said facility;

(f) a piston slidably mounted within said bore for selective movement within the bore to at least two operating positions including a metered fluid flow position, and a fluid flow meter bypass position, said piston having a fluid passageway, said fluid passageway having at least one inlet port and at least one outlet port spaced from said inlet port, said first inlet opening being in fluid communication with said first outlet opening and said second inlet opening being in fluid communication with said second outlet opening when said piston is in said metered fluid flow position to enable fluid from said source to flow through said meter to said facility, said inlet opening being in fluid communication with said first inlet port and blocked from fluid communication from said first outlet opening and said outlet port being in fluid communication with said second outlet opening and blocked from fluid communication with said second inlet opening so that fluid from said source of fluid is diverted from said meter through said fluid passageway to said facility when said piston is in said fluid flow meter bypass position; and (g) means for enabling said piston to be selectively moved to any one of its operating positions within said housing.

2. A valve assembly as recited in claim 1, wherein said piston is movable within said bore to at least a third operating position which is a fluid shut-off position for preventing flow of fluid from said source of fluid to said meter and to said facility.

3. A valve assembly as recited in claim 2, wherein when said piston is in said fluid shut-off position said first inlet opening and said second inlet opening are by said piston.

4. A valve assembly as recited in claim 1, wherein said housing has a first end which contains said first inlet opening and said first outlet opening and a second end which contains said second inlet opening and said second outlet opening, and wherein said inlet port is located at said first end and is a first inlet port and said outlet port is located at said second end and is a first outlet port, said piston having a second inlet port and a second outlet port at said first end so that said second inlet port is aligned with said first inlet opening and said second outlet port is aligned with said first outlet opening when said piston is in said metered fluid flow position to enable fluid to flow from said source of fluid into said first inlet opening, through said piston via said second inlet and outlet openings and through said first outlet opening to said meter.

5. A valve assembly as recited in claim 1, wherein said housing has a first end which contains said first inlet opening and said first outlet opening and a second end which contains said second inlet opening and said second outlet opening, and wherein said inlet port is located at said first end and is a first inlet port and said outlet port is located at said second end and is a first outlet port, said piston having a second inlet port and a second outlet port at said second end so that said second inlet port is aligned with said second inlet opening and said second outlet port is aligned with said second outlet opening when said piston is in said metered full flow position to enable fluid to flow from meter into said second inlet opening, through said piston via said second inlet and outlet openings and through said second outlet opening to said facility.

6. A valve assembly as recited in claim 1, wherein said locating means comprises:

(a) a connector fixed to one end of said piston and extending freely through one end of said housing to a free end located outside of said housing; and (b) a handle fixed to the free end of said connector.

7. A valve assembly as recited in claim 6, wherein said connector includes a visual indicator which is physically referenced against a fixed point on said housing to function as a visual indicator of the several positions of said piston within said housing.

8. A valve assembly as recited in claim 6, wherein said assembly further comprises locking means for locking said connector against movement relative to said housing at least one of the selected positions of said piston within said housing.

9. A valve assembly as recited in claim 8, wherein the free end of said connector has at least one aperture and said locking means comprises:

(a) a bracket fixed to said housing adjacent the free end of said connector said bracket having at least one aperture which is aligned with the aperture in said bracket when said piston is in one of its selected positions; and (b) a lock which includes an element for extending through the apertures in said bracket and said connector when said piston is in one of its selected position within said housing.

10. A valve assembly as recited in claim 1, wherein said piston is movable within said bore to at least a third operating position which is an intermediate position for enabling fluid to flow from said source of fluid to said meter and to said facility.

11. A valve assembly as recited in claim 10, wherein when said piston is in said intermediate position said first inlet port is at least partially connected to said first inlet opening, said first outlet port is at least partially connected to said second outlet opening and said first inlet opening is in fluid communication with said first outlet opening.

* * * * *